United States Patent [19]

Lamping et al.

[11] Patent Number: 4,693,385
[45] Date of Patent: Sep. 15, 1987

[54] STERILIZATION-RESISTANT GLASS CONTAINER SEALED WITH AN ALUMINUM COMPOSITE FILM

[75] Inventors: Alfons Lamping, Corminboeuf; Beat Karth, Oberönz, both of Switzerland

[73] Assignee: Nyffeler Corti, Kirchberg BE, Switzerland

[21] Appl. No.: 731,088

[22] Filed: May 6, 1985

[30] Foreign Application Priority Data

May 7, 1984 [DE] Fed. Rep. of Germany ....... 3416754

[51] Int. Cl.⁴ ............................................. B65D 51/00
[52] U.S. Cl. ...................................... 215/232; 156/69
[58] Field of Search ........................... 215/232; 156/69; 428/415, 417, 441

[56] References Cited

U.S. PATENT DOCUMENTS 4,442,129  4/1984  Niwa et al. ..................... 215/232 X Primary Examiner—Donald F. Norton

[57] ABSTRACT

A sterilization-resistant, sealed glass container is produced by providing the rim of the glass container with a thermoplastic coating of a baking varnish and then heat-sealing an aluminum/polypropylene composite film on to said coating. The rim of the glass container may, optionally, be pretreated with an adhesion promotor before the baking varnish is applied.

14 Claims, 1 Drawing Figure

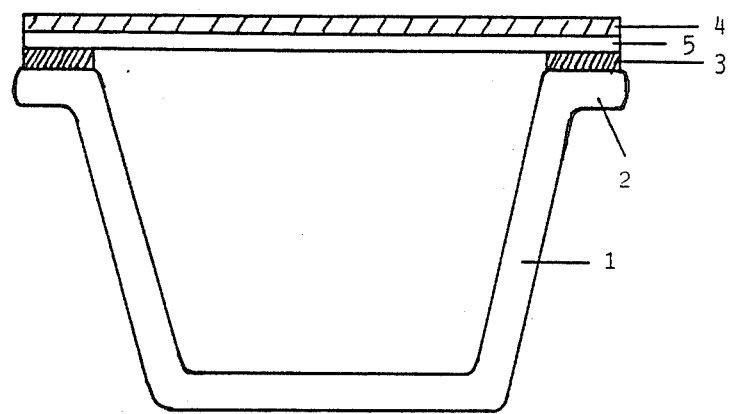

STERILIZATION-RESISTANT GLASS CONTAINER SEALED WITH AN ALUMINUM COMPOSITE FILM

The present invention relates to a sterilization-resistant glass container which is sealed with an aluminum/polypropylene composite film and to a process for its production.

The heat-sealing of glass containers is attracting increasing attention since it combines the modern packing technology of heat-sealing with the advantages of the packing material glass (transparency etc.). To date, however, no glass-sealing method was available that enabled a sterilization of heat-sealed glass containers since the conventional heat-sealing media does not withstand the temperatures employed during sterilization.

In the field of varnishes, baking varnishes are known which show excellent adhesion to metal surfaces and are suited for use in the food industry. Polypropylene organosols and varnishes for coil-coating or for coating the inside of tins belong to these varnishes.

Surprisingly, it has been found that these baking varnishes not only adhere well to metal but also to glass. This was especially unexpected since glass surfaces, owing to the presence of hydrophilic groups which are always covered with a hydrous film. There is also the potential danger that the water molecules could penetrate the boundary between glass and varnish during steam-sterilization and cause the organic coating to peel off from the glass surface. The invention has, on the contrary, shown that a firm and sterilization-resistant adhesion is achieved if an aluminum/polypropylene composite film is heat-sealed to the rim of a glass container which is coated with a baking varnish. Thus, for the first time, it is possible to produce heat-sealed glass preserves.

The sterilization-resistant, sealed glass container according to the present invention comprises, as a closing membrane, an aluminum/polypropylene composite film sealed to a thermoplastic coating of a baking varnish provided on the rim of the glass container.

The preferred baking varnishes used in accordance with the invention are polypropylene organosols, i.e. dispersions of polypropylene in high-boiling hydrocarbons of the type sold as MORPRIME by Morton Chemical, and thermoplastic coil-coating epoxy varnishes. More preferable are mixtures of these polypropylene organosols and thermoplastic coil-coating epoxy varnishes. The polypropylene component of these mixtures causes an increase of the softening temperature of the coating to about 150° to 160° C., i.e. above the usual sterilization temperature of about 121° C.

These baking varnishes are dried at relatively high temperatures (about 250° C.). During drying, a chemical cross-linking of the coating occurs in such a way that the dry coating still has thermoplastic properties and can be heat-sealed against itself or other, chemically similar materials. If, thus, a conventional aluminum/polypropylene composite film is sealed on to the coating with the polypropylene layer facing the coating, a mechanically and thermally stable heat-sealed bond is achieved.

Before the baking varnish is applied, the glass rim to be sealed can, optionally, be pretreated with an adhesion promotor, for example an organosilane such as vinyltriethoxysilane or gamma glycidoxypropyltrimethoxysilane or an organotitanate such as tetrapropyltitanate or tetrabutyltitanate so as to improve adhesion.

The sterilization-resistant glass container produced in this way and sealed with an alumimum/polypropylene composite film may, for example, be sterilized at 121° C. for 30 minutes in a counter-pressure autoclave.

The drawing schematically depicts an embodiment of a glass container 1 according to the invention, which has a baking varnish layer 3 on its rim 2 on to which a composite film composed of an aluminum layer 4 and a polypropylene layer 5 has been sealed.

What is claimed is:

1. A sterilization-resistant, heat sealed glass container which comprises, as a closing membrane, an aluminum/polypropylene composite film sealed to a thermoplastic coating of a baking varnish provided on the rim of the glass container.

2. The glass container according to claim 1, wherein said baking varnish is selected from the group consisting of a polypropylene organosol and a thermoplastic epoxy varnish.

3. The glass container according to claim 2, wherein varnish is a mixture of a polypropylene organosol and a thermoplastic epoxy varnish.

4. The glass container according to claim 1, wherein the rim of the glass container is pretreated with an adhesion promotor.

5. The glass container according to claim 4, wherein said adhesion promotor is selected from the group consisting of an organosilane and an organotitanate.

6. A process for the production of a sterilization-resistant, sealed glass container which comprises providing the rim of the glass container to be sealed with a thermoplastic coating of a baking varnish and heat-sealing an aluminum/polypropylene composite film on to the coated rim.

7. The process according to claim 6, wherein the baking varnish is selected from the group consisting of a polypropylene organosol and a thermoplastic epoxy varnish.

8. The process according to claim 7, wherein a mixture of a polypropylene organosol and a thermoplastic epoxy varnish is used as the baking varnish.

9. The process according to claim 6, wherein the rim of the glass container is pretreated with an adhesion promoter before the baking varnish is applied.

10. The process according to claim 9, wherein a member selected from the group consisting of an organosilane and an organotitanate is used as the adhesion promotor.

11. The process of claim 6 wherein the baking varnish is dried at a temperature of about 250° C. prior to sealing the container with the composite film.

12. A sterilization-resistant, heat-sealed glass container which comprises
a thermoplastic baking varnish provided on the rim of the glass container, and
a closure provided for the glass container, said closure comprising an aluminum polypropylene composite film heat sealed to the thermoplastic baking varnish, said polypropylene portion of the composite film facing said thermoplastic baking varnish.

13. The sterilization-resistant, heat-sealed glass container of claim 12 wherein the baking varnish is polypropylene dispersed in high-boiling hydrocarbons having a softening temperature higher than the sterilization temperature.

14. The sterilization-resistant, heat-sealed glass container of claim 12 wherein the glass rim is provided with an adhesion promotor selected from the group consisting of vinyltriethoxysiolane, gamma glycidoxypropyltrimethoxysilane, tetrapropyltitanate and tetrabutyltitanate.

* * * * *